United States Patent [19]
Chun et al.

[11] Patent Number: 5,923,777
[45] Date of Patent: Jul. 13, 1999

[54] METHOD FOR IRREGULAR TRIANGLE MESH REPRESENTATION OF AN IMAGE BASED ON ADAPTIVE CONTROL POINT REMOVAL

[75] Inventors: Kang-wook Chun, Seoul; Jae-moon Jo, Kyungki-do; Byeungwoo Jeon, Sungnam, all of Rep. of Korea

[73] Assignee: Samsung Electronics Co., Ltd., Kyungki-Do, Rep. of Korea

[21] Appl. No.: 08/705,644

[22] Filed: Aug. 30, 1996

[30] Foreign Application Priority Data

Aug. 30, 1995 [KR] Rep. of Korea ................. 95-27745
Jan. 22, 1996 [KR] Rep. of Korea ................. 96-1327

[51] Int. Cl.$^6$ ........................................... G06K 9/34
[52] U.S. Cl. ........................................ 382/173; 382/241
[58] Field of Search ..................... 382/173, 241, 382/242, 243; 395/120, 123, 127, 130, 136; 345/420, 423, 427, 430, 436, 428

[56] References Cited

U.S. PATENT DOCUMENTS

| 5,193,145 | 3/1993 | Akeley | 345/423 |
| 5,440,674 | 8/1995 | Park | 345/423 |
| 5,566,281 | 10/1996 | Tokumasu et al. | 345/420 |
| 5,602,979 | 2/1997 | Loop | 395/123 |
| 5,654,771 | 8/1997 | Tekalp et al. | 382/241 |

OTHER PUBLICATIONS

Hoppe et al., Mesh Optimization, Aug. 1993, pp. 19–26.
Sullivan et al., Motion Compensation for Video Compression using Control Grid Interpolation, May 1991, pp. 2713–2716.
Wang et al., Active Mesh—A Feature Seeking and Tracking Image Sequence Representation Scheme, Sep. 1994, pp. 610–624.
Turk, Re–Tiling Polygonal Surfaces, Jul. 1992, pp. 55–64.
Nieweglowski et al., A novel video coding scheme based on temporal prediction using digital image warping, Aug. 1993, pp. 141–150.
Nakaya et al, Motion compensation based on spatial transformations, Jun. 1994, pp. 339–356.
Schroeder et al., Decimation of triangle meshes, Jul. 1992, pp. 65–70.

Primary Examiner—Amelia Au
Assistant Examiner—Timothy M. Johnson
Attorney, Agent, or Firm—Sughrue, Mion, Zinn, Macpeak & Seas, PLLC

[57] ABSTRACT

An image representation method for representing an image using triangular mesh which is adaptively formed based on a degree of texture description of the image. The image representation method includes segmenting an image using regular rectangular grids, where each vertex point of the rectangular grid is an individual pixel within an image; generating regular triangular meshes with respect to the image using pixel data associated with four vertex points of each respective rectangular grid formed by the segmentation; computing the degree of texture description of the image relative to respective control points, which correspond to the vertex points of the regular triangular meshes; removing a control point with the least texture description among the texture descriptions calculated for the control points; triangulating a region of support which is enclosed by control points neighboring the removed control point and associated with the removed control point, into irregular triangular meshes such that each neighboring control point functions as a vertex point; and repeating the steps of 1) control point removal, 2) triangulation of the region of support associated to the removed control point, and 3) removal of meshes on the basis of the texture description associated with the remaining control points until the number of the remaining control points after triangulation reaches a predetermined number.

7 Claims, 5 Drawing Sheets

FIG. 3A  FIG. 3B  FIG. 3C
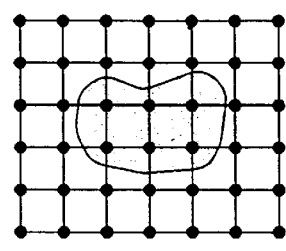
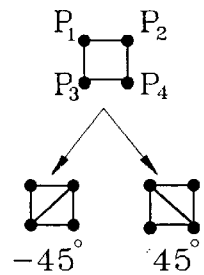
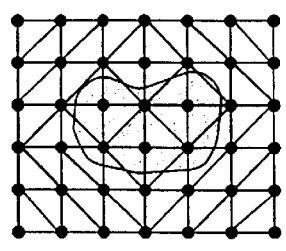
FIG. 4A  FIG. 4B
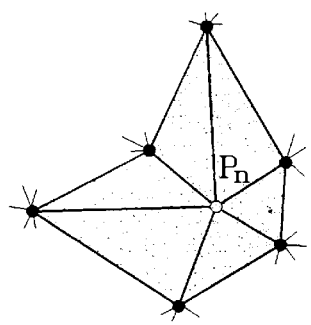
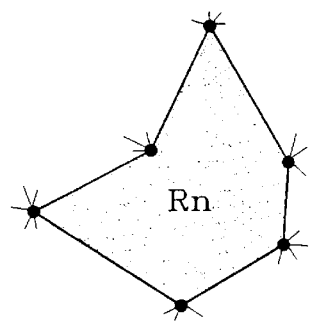
FIG. 4C
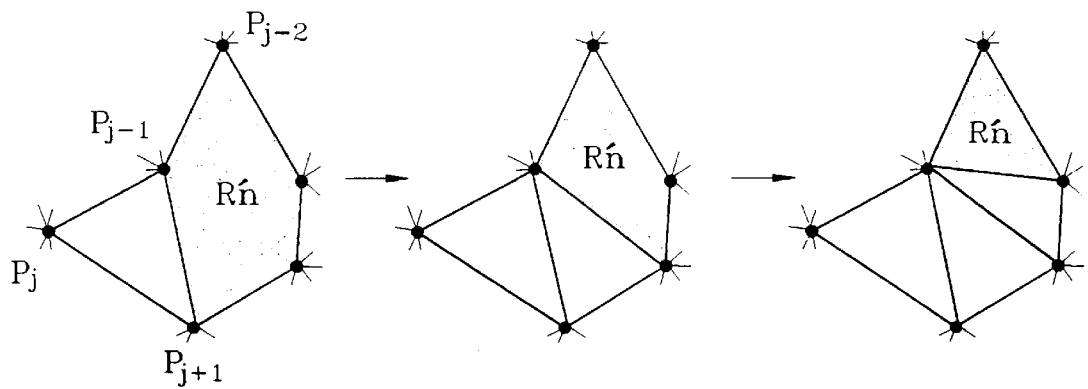

METHOD FOR IRREGULAR TRIANGLE MESH REPRESENTATION OF AN IMAGE BASED ON ADAPTIVE CONTROL POINT REMOVAL

BACKGROUND OF THE INVENTION

The present invention relates to an image representation method using triangular mesh, and more particularly to a method for irregular triangular mesh representation of an image based on adaptive removal of control points defining the triangular mesh.

Recently, there have been increasing demands for video communication using very low bit-rates. In video coding at a low bit-rate, the proportion of motion information increases as the bit-rate is reduced. Consequently, efficient motion compensation is a key part of video coding is in very low bit-rate applications. The hybrid coding scheme based on block-based motion compensation and the discrete cosine transform (MC-DCT) has been most widely used. Though block-based motion compensation has provided relatively good overall performance, it also has several drawbacks including blocking artifacts due to the insufficiency of the motion model to represent the real object motion.

To overcome this limitation imposed by image processing based on blocks, several new approaches have been studied with regard to low bit-rate imaging such as MPEG-4. As a result of the studies, many coding methods employing more sophisticated motion models, such as image warping (or spatial transformation) have been proposed. These methods are shown in the following-references.

[1] J. Nieweglowski, T. G. Campbell, and P. Haavisto, "A novel video coding scheme based on temporal prediction using digital image warping," *IEEE Trans. Consumer Electronic*, Vol. 39, pp. 141–150, Aug. 1993;

[2] Y. Wang and 0. Lee, "Active mesh-a feature seeking and tracking image sequence representation scheme," *IEEE Trans. Image Processing*, Vol. 3, No. 5, pp. 610–624, Sept. 1994;

[3] Y. Nakaya and H. Harashima, "Motion compensation based on spatial transformations," *IEEE Trans. Circuit and Systems for video Technology*, Vol. 4, No. 3, pp 339–356, June 1994;

[4] G. J. Sullivan and R. L. Baker, "Motion compensation for video compression using control grid interpolation," *Proc. ICASSP '91*, Toronto, Canada, pp. 2713–2716, May 1991;

[5] J. Nieweglowski and P. Haavisto, "Motion vector field reconstruction for predictive video sequence coding," *International Workshop on Coding Technique for Very low Bit-Rate Video*, United Kingdom, paper No. 6.4, Apr. 7–8, 1994.

[6] Ouseb Lee and Yao Wang, "Non-uniform sampling and interpolation over deformed meshes and its hierarchical extension," *Proc. SPIE Visual Communications and Image Processings '95*, Vol. 2501, pp. 389–400, 1995.

In warping prediction, a set of control points are placed in an image frame and displacement for each control point is transmitted so that predicted frame can be reconstructed by using the spatial transformation of each control point. Two types of motion estimation, backward estimation and forward estimation are possible. In forward estimation, primary control points are placed in a previous frame and the motion is estimated by finding locations corresponding to a current frame. See Ref. [1]. In backward estimation, however, control points are defined in a current frame and their motion is referenced based on the previous frame. See Refs. [3]–[5].

The forward estimation has advantages over the backward estimation because it is suitable for an irregular mesh structure without requiring additional information on the mesh structure. It has also been noted that the use of an irregular mesh structure can reduce the prediction error.

Irregular mesh generation algorithms have been well studied in the area of computer graphics to model solid three-dimensional objects. The following references are illustrative:

[7] H. Hoppe, T. DeRose, T. Duchamp, J. McDonald, and W. Stuetzle, "Mesh optimization," *Computer Graphics (SIGGRAPH'93 Proceedings)*, Anaheim, Calif., pp. 19–26, Aug. 1–6, 1993;

[8] G. Turk, "Re-tiling polygonal surfaces," *Computer Graphics (SIGGRAPH'92 Proceedings)*, Chicago, pp 55–64, Jul. 26–31, 1992;

[9] W. J. Schroeder, J. A. Zarge, and W. E. Lorensen Decimation of Traingular meshes," *Computer Graphics (SIGGRAPH '92 Proceedings)*, Chicago, pp 65–70, Jul. 26–31, 1992.

Recently, Wang and Lee proposed an image sequence representation scheme using non-uniform control points embedded in a deformed mesh structure where each frame is initially represented by regular rectangular meshes (or rectangular meshes generated using quad tree segmentation). See Refs. [2]–[6]. The original regular meshes are deformed so that each control point is moved to the closest feature point, such as an edge. Wang et al. have shown that an irregular mesh can represent a frame more accurately than the uniform regular mesh. However, there is a problem of determining the valid positions of the control points in the regions having no salient features because the schemes of Wang and Lee use local feature tracking algorithms for a fixed number of control points based on the initial regular meshes.

SUMMARY OF THE INVENTION

Therefore, to overcome the above problem of placing control points, it is an object of the present invention to provide an irregular triangular mesh representation method of an image which can represent image texture including salient features such as edges and corners.

To accomplish the object of the present invention, there is provided an image representation method using image segmentation, the method comprising the steps of:

(a) segmenting an image with a plurality of rectangular grids, each rectangular grid having four vertex points corresponding to a pixel within the image;

(b) generating regular triangular meshes from said plurality of rectangular grids based on pixel data associated with the four vertex points of each respective rectangular grid obtained by the segmentation of step (a);

(c) determining a degree of texture description of the image relative to each respective control point corresponding to each vertex point of the triangular meshes;

(d) removing a control point having the least texture description among the computed texture description in step (c);

(e) triangulating a region of support which is enclosed by lines joining a set of control points neighboring the control point removed in step (d) into irregular triangular meshes such that said neighboring control points are vertex points for the irregular triangular meshes; and (f) repeating steps (c) through (e) until the number of the remaining control points reaches a predetermined number.

BRIEF DESCRIPTION OF THE DRAWINGS

The above objects and other advantages of the present invention will become more apparent by a detailed description of a preferred embodiment thereof with reference to the attached drawings in which:

FIGS. 3A–3C show the steps for generating initial triangular meshes, in which FIGS. 3A to 3C show a regular rectangular mesh, two alternative partitioning methods to form a triangular mesh, and an initial triangular mesh, respectively;

FIGS. 4A–4C are examples of triangulation, in which FIGS. 4A to 4C show a selected control point, removal of the selected control point, and repetition of triangulation, respectively.

DETAILED DESCRIPTION OF THE PREFERRED EMBODIMENT

A preferred embodiment of the present invention will be described below in more detail with reference to the accompanying drawings.

The most important issue for warping prediction (or spatial transformation) is how to place the control points in regions containing salient features such as edges and corners. We noted that the control points should be placed adaptively taking into account the image contents. Specifically, in plain regions with low texture variation, a small number of relatively large-sized meshes should be sufficient to represent the image, and in high-textured areas, a large number of smaller meshes should be used. This adaptive approach favors an irregular mesh structure. The present invention focuses on this issue, especially on the irregular mesh representation of an image. The present invention proposes a new scheme of image representation based on an irregular triangular mesh structure in which a considerably reduced number of control points are adaptively selected from an initial arrangement of uniformly distributed control points.

A new scheme of image representation using irregular triangular mesh and adaptive control point removal in accordance with the present invention starts with regular triangular meshes. Irregular triangular meshes are obtained by successively removing selected control points. The scheme of the present invention takes into account global features of an image in successive control point removal, and can therefore provide better image representation over conventionally known image representation methods.

Under a triangular mesh structure, assume an image is represented by a set of M triangular meshes, $\Im=\{T_m, m=1, 2, \ldots M\}$ where a triangular mesh $T_m$ is specified by three vertex points. A vertex point will also be referred to as a control point since controlling vertex location is equivalent to deforming the triangular mesh. Assume further that a total of N control points are used to the define meshes in the set $\Im$. There are several triangular meshes which share a common control point. This subset of triangular meshes is denoted by $K_n$, which refers to meshes connected to a common n-th control point $P_n$. The number of meshes in $K_n$ is assumed to be $J_n$. Note that the number of neighboring control points which are directly connected to the n-th control point by a single edge is also $J_n$. This set of neighboring control points is denoted as $\gamma=\{P_j, j=1, 2, \ldots, J_n\}$.

Figure 1A:
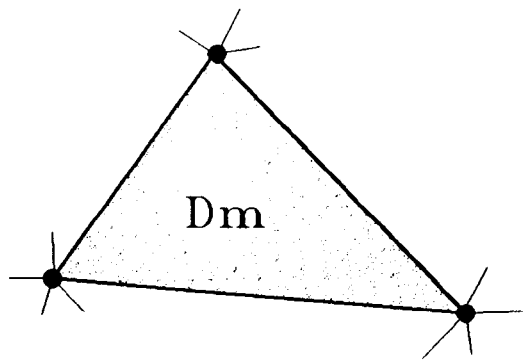
FIGS. 1A and 1B show a domain Dm of triangular mesh $T_m$ and the region of support $R_n$ of a control point $P_n$, respectively.
Figure 1B:
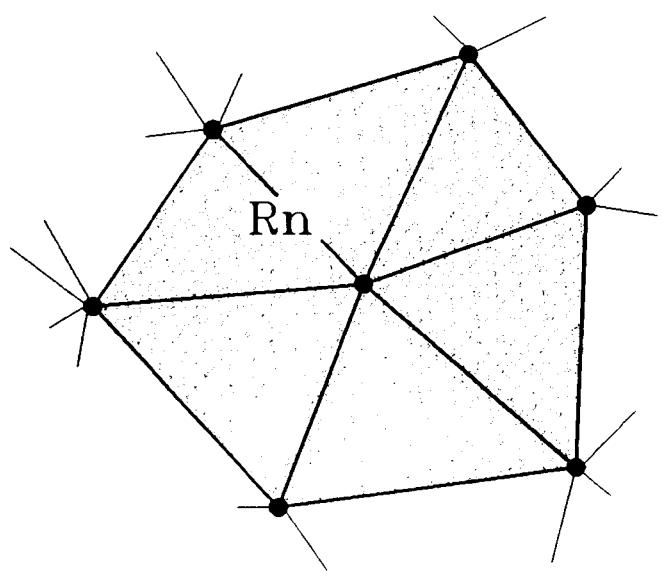

For a triangular mesh $T_m$, domain $D_m$ is defined as the region enclosed by the triangular mesh as shown in FIG. 1A. Also defined is the region of support $R_n$ corresponding to the n-th control point $P_n$, as shown in FIG. 1B. $R_n$ is formed by merging the domains of triangular meshes connected to the control point $P_n$ as, $$R_n = \bigcup_{T_m \subset K_n} D_{m'} \quad n = 1, \ldots, N \tag{1}$$

The spatial location of each pixel is specified by $p=(x,y)^t$, and $p_n=(x_n,y_n)^t$ is the position of the n-th control point. The gray value of the pixel is given by $g(p)$. For the best placement of control points, a mesh representation error criterion is defined which will be used for selecting a control point to be removed.

For a given mesh structure, the interpolated grey value $\hat{g}(p)$ of a pixel at $p=(x,y)^t$ inside the m-th triangular mesh is computed by using a first order polynomial as follows;

$$\hat{g}(p)=a \cdot x+b \cdot y+c, \ p=(x,y)^t \in D_m \tag{2}$$

where a, b and c are uniquely determined by using three known gray values of the three control points of the mesh. A representation error $I_m$ for m-th triangular mesh is defined as:

$$I_m = \frac{1}{N_m} \sum_{p \in D_m} \{g(p) - \hat{g}(p)\}^2, m = 1, \ldots, M \tag{3}$$

where $N_m$ is the number of pixel points within the is domain $D_m$. The representation error An associated with a control point is defined as an average of representation errors of the triangular meshes connected to the control point:

$$A_n = \frac{1}{J_n} \sum_{T_m \subset K_n} I_m, \quad n =, \ldots, N \tag{4}$$

A method for the irregular triangular mesh representation of the present invention will be described as follows.

Figure 2:
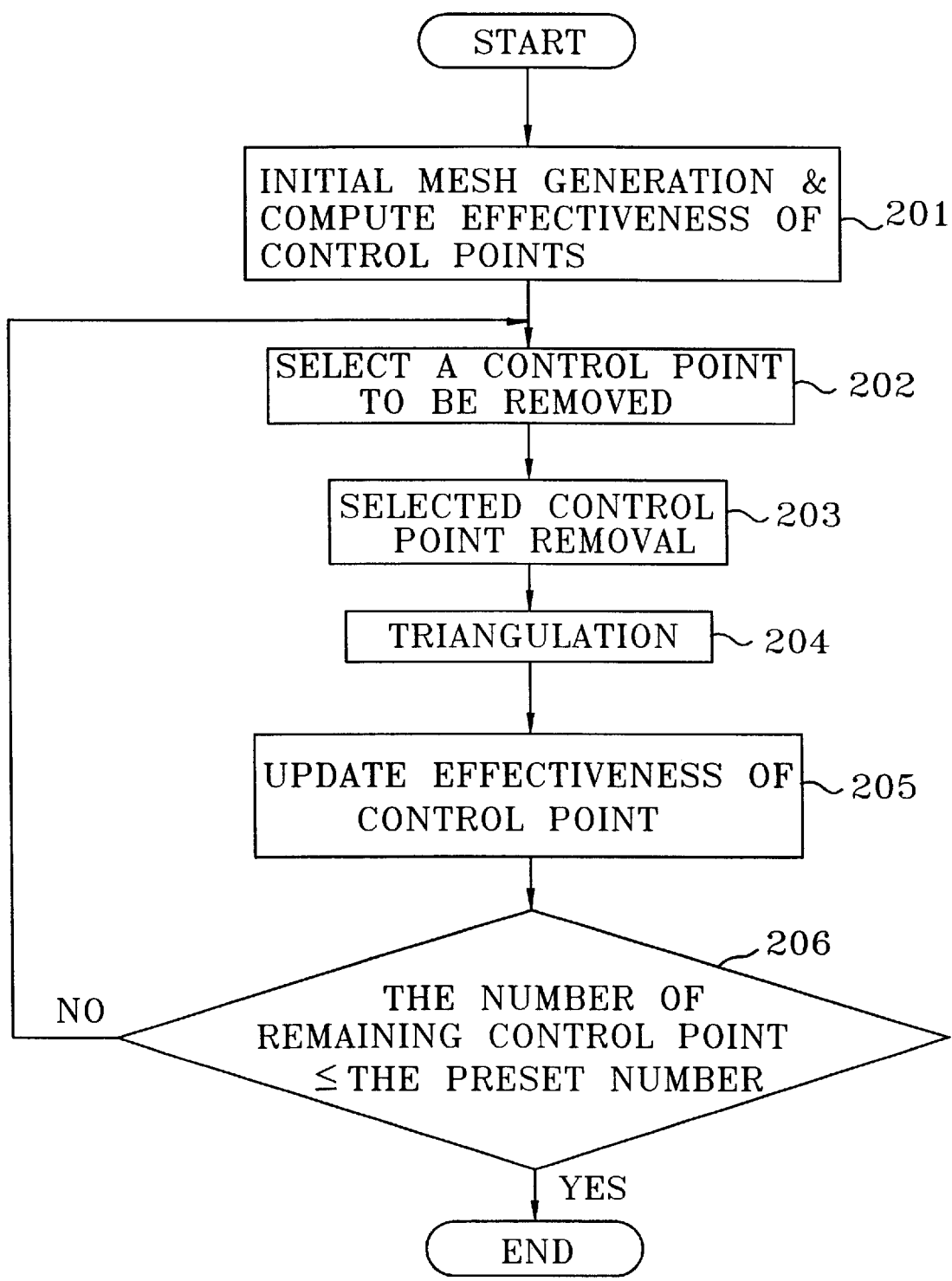
FIG. 2 is a flowchart showing an overall description of the proposed irregular mesh representation algorithm.
Figure 5A:
FIGS. 5A–5D and FIGS. 6A–6D show subjective visual quality comparisons for two images between the conventional regular mesh representation and a newly proposed irregular triangular mesh representation according to the present invention.
Figure 5B:
Figure 5C:
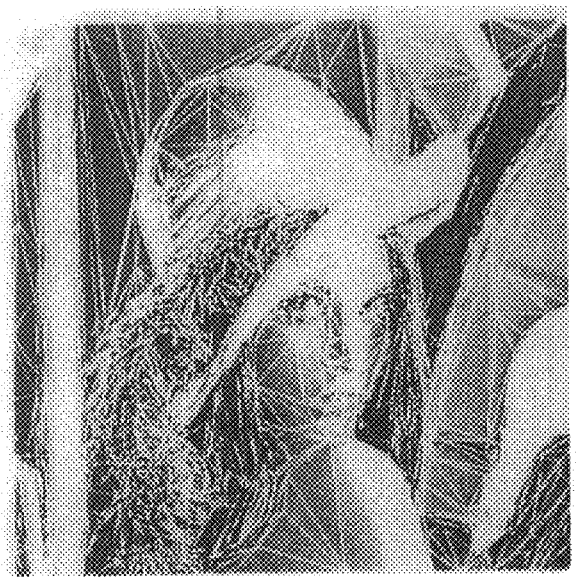
Figure 5D:
Figure 6A:
Figure 6B:
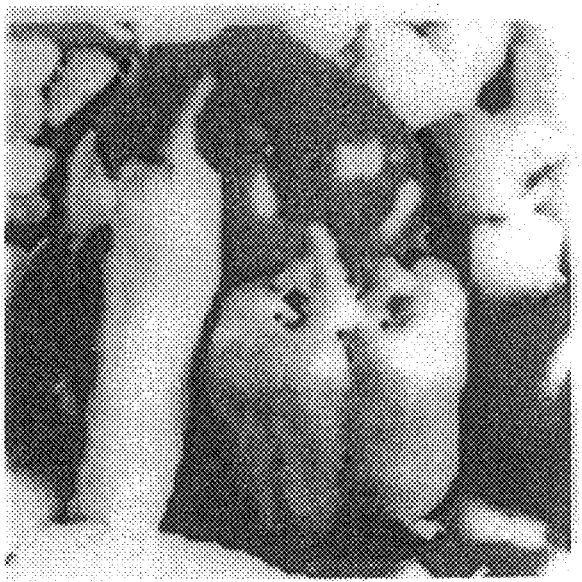
Figure 6C:
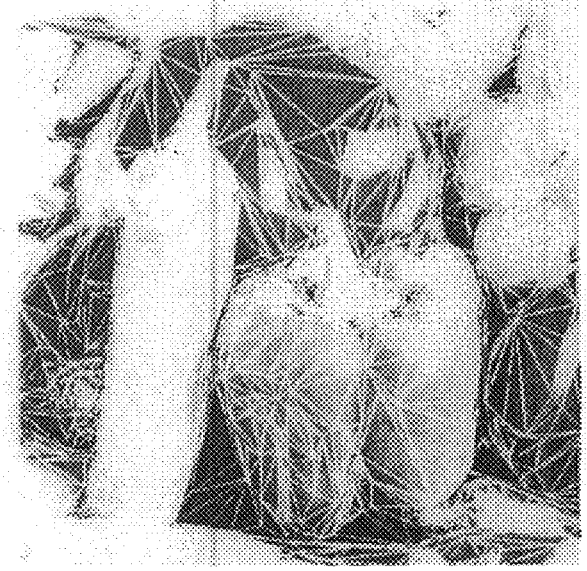
Figure 6D:

FIG. 2 is a flowchart showing an overall description of the proposed irregular mesh representation algorithm. The flowchart of FIG. 2 consists of a step 201 of initial mesh generation and the initial judgment of effectiveness of control points in a regular triangular mesh representation. Following this initial step are the reiteratively performed steps 202–206 to reduce the number of control points by adaptive removal of control points. The routine comprises the step 202 of selecting a control point with the least change in average representation error, the step 203 of removing the selected control point, the step 204 of triangulating the region of support associated with the removed control point, and the step 205 of updating change of an average representation error corresponding to the removed control point, and the step 206 of checking for an exit condition to cease the iteration of steps 202–206. By executing the routine, a new set of irregular triangular mesh $\Im'$ with a smaller number of control points can be formed. Each step will be described in more detail below.

In the step 201, an image is initially represented by a set of regular triangular meshes with regularly distributed control points. For initial triangular mesh representation, a set of initial control points is chosen as a set of vertices defined by r×r regular rectangular grids in an image as shown in FIG. 3A. Preferably, initial control points are obtained by a predetermined interval of pixel sampling with respect to a given image frame. An initial control point in the central portion of the grid has four neighboring control points in horizontal and vertical directions. With the set of initial control points and regular rectangular meshes, initial triangular meshes can be obtained by splitting each rectangular element into two triangular elements. There are two alternative directions for dividing the rectangular grids, as shown in FIG. 3B. The rectangles may be triangulated with +45° and −45° diagonals. The triangulation criterion for splitting these rectangular elements is defined based on a local similarity of grey levels at four control points $P_1$–$P_4$. Let $P_1$, $P_2$, $P_3$ and $P_4$ be four control points of a rectangular grid, and $g(p_1)$, $g(p_2)$, $g(p_3)$ and $g(p_4)$ be their grey levels as shown in FIG. 3B. A good partition of the grid defined by $P_1$, $P_2$, $P_3$ and $P_4$ can be found by measuring the similarity defined as $|\Delta g|_{45} = |g(p_1) - g(p_4)|$ and $|\Delta g|_{-45} = |g(p_2) - g(p_3)|$. If $|\Delta g|_{45}$ is less than $|\Delta g|_{-45}$, the rectangular mesh will be divided on the 45° diagonal, otherwise the mesh will be divided on the −45° diagonal. FIG. 3C shows an example of the initial regular triangular mesh representation of an image.

Given a set of initial control points and initial triangular meshes, the goal of the irregular triangular mesh generation method is to find a set of meshes with a minimum number of control points that fits the spatial features of the image. The set of irregular triangular meshes $\Im$ are determined by removing the control points from the initial set of control points and by iteratively triangulating selected support regions. In order to select a control point that contributes the least to the texture description of the image, that is, that contributes the least information to mesh representation of the image, the descriptiveness of a control point in the mesh representation is quantified by measuring the difference of average representation error associated with the control point as, $$\Delta A_n = (A'_n - A_n)\left(\frac{1}{J'_n}\sum_{T_m \subset K'_n} I_m - A_n\right) \quad (5)$$

where $K_n'$ is the index set of regenerated triangular meshes and $J_n'$ is the number of regenerated triangular meshes after re-triangulation of a support region $R_n$. Detailed description of the re-triangulation process for support region $R_n$ will be given below in the description of step 204. The descriptiveness of the control points using the equation (5) is computed for all initial control points for the regular triangular meshes.

Given the set of initial meshes, the initial control points, and change of average representation error in the equation (5) for each control point, in the step 202 change of average representation error of a control point in the equation (5) is examined. Then a control point with the least change (or difference) of an average representation error among the initial control points is selected for removal. In step 203, the selected initial control point and connection links to its neighboring control points are removed. The selected initial control point $P_n$ and the support region $R_n$ corresponding to the point $P_n$ after the removal of $P_n$ are shown in FIGS. 4A and 4B, respectively. As seen in FIG. 4B, after the initial control point $P_n$ is removed, a polygon delineated by the neighboring control points of the removed control point no longer satisfies the topology of a triangular mesh. Therefore, in order to preserve the triangular mesh topology, triangulation is carried out on the support region $R_n$ in the step 204.

Triangulation process of the step 204 creates a set of new triangular meshes $\Im_n' = \{T_i' \ i=1, \ldots, I_n\}$ in the region $R_n$ by determining the connections between neighboring control points in $\gamma_n$, which is the set of control points that are connected to the removed point $P_n$. In order to preserve the triangular mesh structure, the new triangular mesh must satisfy a constraint that all of its edges should be located inside the region of support $R_n$. This constraint is called "a triangulation constraint." The triangulating algorithm generates one triangular mesh at a time. In a proposed algorithm, each new triangular mesh is generated without considering its later effect on a subsequent triangulation process.

The control points connected to the removed control point $P_n$, represented as a set $\gamma_n$, are scanned clockwise, and its index is ordered in an ordered index set $J_n = \{1, 2, \ldots, j, \ldots, J_n\}$. Then, for each triangular mesh which is defined by the consecutive three control points $P_{j-1}$, $P_j$ and $P_{j+1}$, and which satisfies the triangulation constraint, the representation error in the equation (3) is computed and a triangular mesh with the minimum error is selected as a new triangular mesh. The domain of the new triangular mesh is then extracted from the region $R_n$, which leaves a modified support region $R_n'$ with a set of reduced control points $\gamma_n'$. The triangulation process repeats for the region $R_n$ until a single triangular mesh remains for that region.

The pseudo codes of the proposed triangulation algorithm is given as follows.

```
/* Let P_a be removal control point */
Get_Neighbor_Control_Points(P_n);
J_n = Number_Of_Control_Points(P_n);
γ_n' = γ_n;
R_n' = R_n;
while( Jn > 3 ) {
    for (All_Possible_Combinations(P_a')) {
        Get_Three_Consecutive_Points(P_{j-1},P_3,P_{j+1});
        Check_Topology(ThisTriangle, &Flag);
        if(Flag | = 'Fault') {
            A_ThisTriangle = Compute_Representation_ Error(ThisTriangle);
            Check_Minimum_Error(A_ThisTriangle, &MinFlag);
            if(MinFlag == 'True') {
            }
        }
    }
    Extraction_of_Selected_Triangular_Mesh(SelectedTriangle R_n');
    Update_Control_Points_Set( SelectedTriangle,
    γ_n');
    J_n = Jn - 1;
}
```

New triangular meshes are regenerated by triangulation of the support regions in the step 204. In the step 205, criterion values for control points relating to the new triangular meshes are updated for processing of subsequent control point removal. In other words, the difference in average representation error is calculated. However, for control points which do not neighbor with the removed control point, the update of the criterion value is not necessary. Since updating of the average representation error is performed with the same method as described in the step 201, specific description will not be repeated. In step 206, it is determined whether the number of remaining control points reaches a predetermined number. When the number of remaining control points is same as the predetermined number, the reiterative processing is ended, otherwise a control point removal process is iterated on the basis of the difference of the updated average representation error associated with the remaining control points.

The performance of the proposed image representation scheme is investigated using 512×512 Lena and Pepper monochrome images in terms of the objective quality measured by PSNR which is defined as follows;

$$PSNR = 10 \cdot \log_{10}\left(\frac{255^2}{\frac{1}{L}\Sigma(g-\hat{g})^2}\right) \quad (6)$$

where, g is a gray value of the original pixel, ĝ is a gray value of the reconstructed image, and L is the number of pixels in an image. The performance of the mesh representation scheme based on representation errors which are caused by reconstruction of an image with a given irregular mesh was evaluated. The reconstructed image was obtained by using first order polynomial fitting of the gray values of control points as defined in equation (2).

To implement the proposed scheme, a set of initial control points (or a set of initial triangular meshes) is chosen from the image and the number control points are then reduced by applying the control point removal algorithm. Let 'r' be the resolution of the initial control points both in horizontal and vertical directions and let 'N' be the number of control points. Several results for various values of r and N, as shown in Tables 1 and 2, were obtained. The results show the PSNRs of the reconstructed images with different resolutions of initial control points and different numbers of remaining control points after applying the control points removal algorithm.

TABLE 1

Irregular Triangular Mesh Representation for Lena Image

| | r = 4 | | r = 6 | | r = 8 | |
|---|---|---|---|---|---|---|
| Methods | N | PSNR | N | PSNR | N | PSNR |
| Regular mesh (initial mesh) | 16640 (100%) | 28.48 | 7396 (100%) | 26.14 | 4224 (100%) | 24.53 |
| Irregular mesh | 8320 (50%) | 29.50 | 3698 (50%) | 27.11 | 2112 (50%) | 25.50 |
| | 4160 (25%) | 29.28 | 1849 (25%) | 26.91 | 1056 (25%) | 25.52 |
| | 2080 (12.5%) | 28.13 | 924 (12.5%) | 25.54 | 528 (12.5%) | 24.02 |
| | 1040 (6.25%) | 24.74 | 462 (6.25%) | 23.09 | 264 (6.25%) | 21.78 |

TABLE 2

Irregular Triangular Mesh Representation for Pepper Image

| | r = 4 | | r = 6 | | r = 8 | |
|---|---|---|---|---|---|---|
| Methods | N | PSNR | N | PSNR | N | PSNR |
| Regular mesh (initial mesh) | 16640 (100%) | 28.48 | 7396 (100%) | 26.54 | 4224 (100%) | 24.63 |
| Irregular mesh | 8320 (50%) | 2992 | 3698 (50%) | 27.48 | 2112 (50%) | 25.42 |
| | 4160 (25%) | 29.64 | 1849 (25%) | 27.11 | 1056 (25%) | 24.96 |
| | 2080 (12.5%) | 28.20 | 924 (12.5%) | 25.20 | 528 (12.5%) | 23.11 |
| | 1040 (6.25%) | 24.74 | 462 (6.25%) | 21.55 | 264 (6.25%) | 19.63 |

As shown in the tables, the proposed irregular mesh representation scheme outperforms the regular triangular mesh even with a far smaller number of control points. When the same number of control points was used, the representation performance increases as the resolution of initial regular mesh is decreased. FIGS. 5 and 6 show subjective visual quality comparisons between the conventional regular representation and the newly proposed irregular triangular mesh representation. In the case of r=8 and N=4224, a represented image of regular mesh and a reconstructed image of regular mesh are shown FIGS. 5A and 5B, respectively. In case of r=4 and N=2080, a represented image of irregular mesh and a reconstructed image of irregular mesh are shown FIGS. 5C and 5D, respectively. In case of r=8 and N=4224, a represented image of regular mesh and a reconstructed image of regular mesh are shown FIGS. 6A and 6B, respectively. In case of r=4 and N=2080, the represented image of irregular mesh and the reconstructed image of irregular mesh are shown FIGS. 6C and 6D, respectively.

As shown in FIGS. 5 and 6, the sizes of irregular mesh are smaller and the control points are more concentrated in regions containing more salient features such as edges. Thus, the subjective quality of the reconstructed images is significantly improved in these regions compared with the regular mesh case.

The present invention describes an algorithm to represent an image with irregular triangular mesh. The irregular mesh for an image was designed by applying a successive control point removal algorithm for the initial regular mesh by measuring representation error corresponding to a control point. Because the proposed scheme considers the global feature of an image in successive control point removal process, it can exploit global features of the image and provide better image representation. Computer simulation has shown that the proposed scheme gives improved representation performance compared with the regular mesh representation scheme, especially in regions containing several salient features such as edges.

The proposed irregular mesh representation algorithm can be easily incorporated with motion compensation algorithms based on image warping (or spatial transformation), thus providing better prediction performance for low bit-rate video coding applications.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. An image representation method using image segmentation, said method comprising the steps of:
   (a) segmenting an image with a plurality of rectangular grids, each rectangular grid having four vertex points corresponding to a pixel within the image;
   (b) generating regular triangular meshes from said plurality of rectangular grids based on pixel data associated with the four vertex points of each respective rectangular grid obtained by the segmentation of step (a);
   (c) determining a degree of texture description of the image relative to each respective control point, corresponding to each vertex point of the triangular meshes;
   (d) removing a control point having the least texture description among the computed texture description in step (c);
   (e) triangulating a region of support which is enclosed by lines joining a set of control points neighboring the control point removed in step (d) into irregular triangular meshes such that said neighboring control points are vertex points for the irregular triangular meshes; and
   (f) repeating steps (c) through (e) until the number of the remaining control points reaches a predetermined number, wherein said step (c) further comprises the sub-steps of:
      (c1) determining a first representation error associated with a selected control point using representational triangular meshes;
      (c2) removing the selected control point to define a region of support;
      (c3) triangulating the region of support with the removed control point so that the region of support is represented as a new triangular mesh structure;
      (c4) determining a second representation error associated with the removed control point using the new triangular meshes obtained by triangulation in step (c3); and
      (c5) determining a texture description degree associated with the removed control point based on the difference between the first representation error and the second representation error corresponding to the removed control point.

2. The image representation method according to claim 1, wherein said first representation error is computed by the following equation which is defined prior to removal of the control point n, $$A_n = \frac{1}{J_n} \sum_{T_m \subset K_n} I_{m'}$$

where $K_n$ is the number of meshes associated with the control point n, $T_m$ is one of meshes included in $K_n$, and $J_n$ is the number of control points neighboring to the control point n to be removed, and an error $I_m$ of a triangular mesh $T_m$ is expressed as $$I_m = \frac{1}{N_m} \sum_{p \in D_m} \{g(p) - \hat{g}(p)\}^2,$$

where $N_m$ is the number of pixel points within a domain $D_m$, p is a pixel position (x,y) within the domain $D_m$, g(p) is a gray value of each pixel within the domain $D_m$, and where $\hat{g}(p) = a \cdot x + b \cdot y + c$ where a, b and c are determined by pixel values corresponding to three control points of the triangular mesh $T_m$.

3. The image representation method according to claim 1, wherein said second representation error is computed by the following equation which is defined after the control point n is removed, $$A'_n = \frac{1}{J'_n} \sum_{T_m \subset K'_n} I_m$$

where $K'_n$ is the set of new triangular meshes after the triangulation of the region of support, $T_m$ is one of meshes included in $K'_n$, and $J'_n$ is the number of regenerated triangular meshes after triangulation of the region of support, and a representation error $I_m$ of a triangular mesh $T_m$ is expressed as the following equation, $$I_m = \frac{1}{N_m} \sum_{p \in D_m} \{g(p) - \hat{g}(p)\}^2,$$

where $N_m$ is the number of pixel points within a domain $D_m$, p is a pixel position (x,y) within a domain $D_m$, g(p) is a gray value of each pixel within a domain $D_m$, and where $\hat{g}(p) = a \cdot x + b \cdot y + c$, where a, b and c are determined by pixel values corresponding to three control points of the triangular mesh $T_m$.

4. The image representation method according to claim 1, wherein said step (c3) comprises generating triangular meshes in which each mesh is determined by three control points with the interior region of each mesh falling within the region of support.

5. The image representation method according to claim 1, wherein said step (c3) comprises the sub-steps of
   (ca1) generating all possible triangular meshes with the remaining control points as vertices of the triangular meshes, wherein the interior region of each mesh falls within the region of support;
   (ca2) determining third representation errors corresponding to each triangular mesh generated in said step (ca1);
   (ca3) identifying from said triangulated region of support, the triangular mesh having the least representation error value among the third representation errors computed in step (ca2), and generating a new region of support by extracting the irregular mesh with the least representation error;
   (ca4) iterating steps (ca1) to (ca3) until the region of support forms the new triangular mesh; and
   wherein said step (c5) comprises
   (ca5) determining a texture description with respect to the removed control point, using both the second representation error associated with new triangular meshes determined by step (ca4) and the first representation error associated with the triangular meshes prior to control point removal.

6. The image representation method according to claim 5, wherein said step (ca5) comprises computing a texture description $\Delta A_n$ relating to the control point n using the following equation;

$$\Delta A_n = (A'_n - A_n) = \left( \frac{1}{J'_n} \sum_{T_m \subset K'_n} I_m - \frac{1}{J_n} \sum_{T_m \subset K_n} I_m \right)$$

where, each control point n within said image is defined by the first representation error $A_n$ and the second representation error $A'_n$, in which $K_n$ is a set of triangular meshes associated with a control point n, $J_n$ is the number of triangular meshes prior to the removal of control point n, $K'_n$ is a set of new triangular meshes after re-triangulation for the region of support, $J'_n$ is the number of new triangular meshes, and $I_m$ is the third representation error of each mesh.

7. The image representation method according to claim 5, wherein said step (ca2) comprises computing the third representation error for each of the triangular meshes generated in step (ca1) using the following equation;

$$I_m = \frac{1}{N_m} \sum_{p \in D_m} \{g(p) - \hat{g}(p)\}^2$$

where, domain $D_m$ is defined as a region enclosed by the m-th triangular mesh, $N_m$ is the number of pixel points within the domain $D_m$ g(p) is a gray value of the n-th control point within the m-th triangular mesh, and $\hat{g}(p)$ is the interpolated gray value of a pixel $p=(x,y)^t$ inside the m-th triangular mesh which is denoted as $\hat{g}(p) = a \cdot x + b \cdot y + c$, in which a, b and c are determined by using three known gray values of the three control points of the m-th triangular mesh.

* * * * *